(12) United States Patent
Takeda et al.

(10) Patent No.: US 11,013,035 B2
(45) Date of Patent: May 18, 2021

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/098,997

(22) PCT Filed: May 1, 2017

(86) PCT No.: PCT/JP2017/017188
§ 371 (c)(1),
(2) Date: Nov. 5, 2018

(87) PCT Pub. No.: WO2017/191833
PCT Pub. Date: Nov. 9, 2017

(65) Prior Publication Data
US 2019/0166627 A1     May 30, 2019

(30) Foreign Application Priority Data
May 6, 2016   (JP) .............................. JP2016-093479

(51) Int. Cl.
*H04W 74/08*      (2009.01)
*H04L 1/18*       (2006.01)
(Continued)

(52) U.S. Cl.
CPC ........... *H04W 74/0833* (2013.01); *H04L 1/18* (2013.01); *H04L 5/0094* (2013.01);
(Continued)

(58) Field of Classification Search
CPC ......... H04W 74/002–008; H04W 4/70; H04W 72/02; H04W 72/048; H04W 72/14; H04L 5/0053–0055
See application file for complete search history.

(56) References Cited

U.S. PATENT DOCUMENTS

| 10,085,245 B2 | 9/2018 | Lee et al. | |
| 2012/0236816 A1* | 9/2012 | Park | H04W 74/08 370/329 |

(Continued)

FOREIGN PATENT DOCUMENTS

WO   2015/122737 A1   8/2015

OTHER PUBLICATIONS

International Search Report issued in PCT/JP2017/017188 dated Jun. 20, 2017 (1 page).

(Continued)

*Primary Examiner* — Marcus Smith
(74) *Attorney, Agent, or Firm* — Osha Bergman Watanabe & Burton LLP

(57) ABSTRACT

The present invention is designed so that retransmission control and/or division transmission are executed properly when contention-based UL transmission is used. A transmission section that transmits UL data, and a control section that controls retransmission and/or division transmission of the UL data are provided, and the control section exerts control to perform new UL data transmission before the retransmission and/or initial transmission in the division transmission without UL grant from a radio base station, and the control section controls the retransmission and/or second and subsequent transmissions in the division transmission based on a response signal from the radio base station.

4 Claims, 14 Drawing Sheets

(51) Int. Cl.
*H04L 5/00* (2006.01)
*H04W 72/04* (2009.01)
*H04W 72/14* (2009.01)
*H04W 76/27* (2018.01)
*H04W 76/28* (2018.01)
*H04W 80/08* (2009.01)

(52) U.S. Cl.
CPC ....... *H04W 72/0446* (2013.01); *H04W 72/14* (2013.01); *H04W 74/0841* (2013.01); *H04W 76/27* (2018.02); *H04W 76/28* (2018.02); *H04W 80/08* (2013.01)

(56) References Cited

U.S. PATENT DOCUMENTS

2014/0185575 A1* 7/2014 Morioka ................. H04W 8/24
370/329
2015/0289292 A1* 10/2015 Sun .................. H04W 74/0833
370/329
2016/0366704 A1* 12/2016 Lee .................. H04W 72/0413
2017/0135115 A1* 5/2017 Cho .......................... H04L 1/00
2017/0280438 A1* 9/2017 Balachandran ....... H04W 76/10
2018/0310329 A1* 10/2018 Yang .................... H04L 1/1607

OTHER PUBLICATIONS

Written Opinion of the International Searching Authority issued in PCT/JP2017/017188 dated Jun. 20, 2017 (3 pages).

Samsung; "Ultra-reliability with low-latency support in 5G new radio interface"; 3GPP TSG RAN WG1 Meeting #84bis, R1-162189; Busan, Korea; Apr. 11-15, 2016 (5 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

* cited by examiner

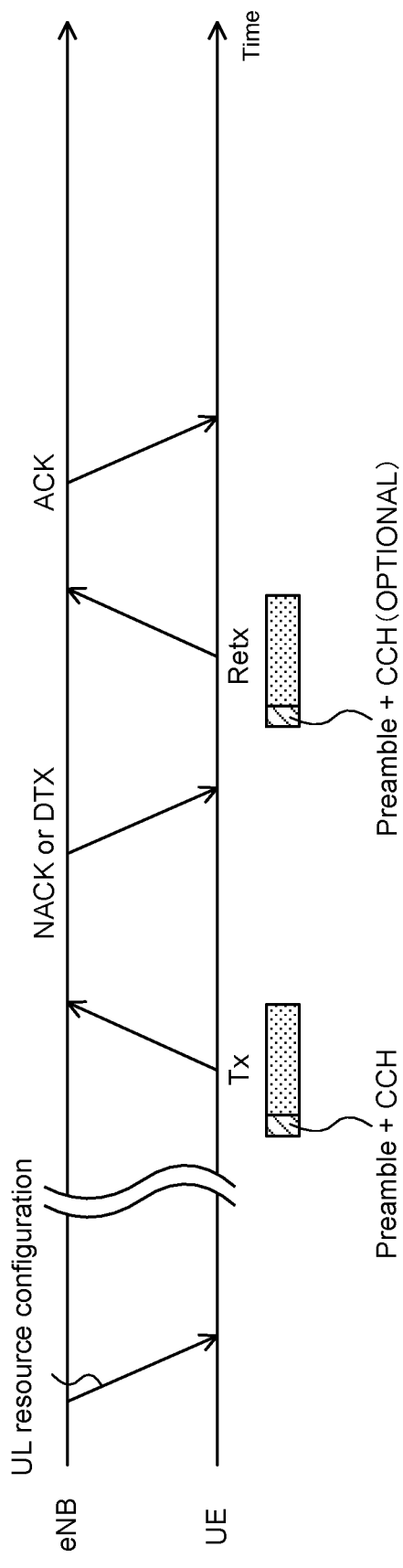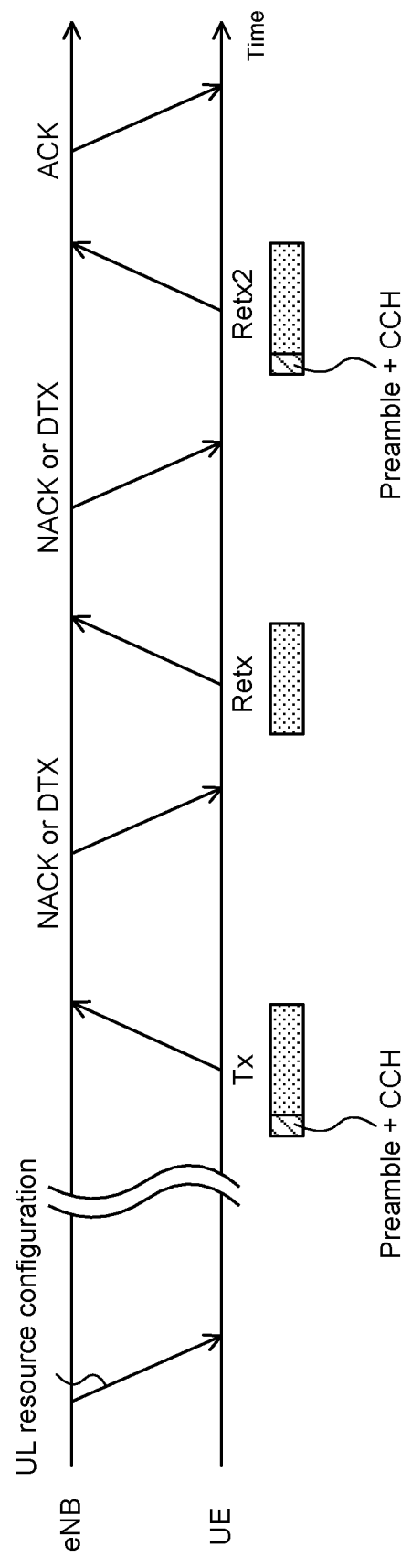

USER TERMINAL AND RADIO COMMUNICATION METHOD

TECHNICAL FIELD

The present invention relates to a user terminal and a radio communication method in next-generation mobile communication systems.

BACKGROUND ART

In the UMTS Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), when UL synchronization is established between a radio base station and a user terminal, UL data can be transmitted from the user terminal. For this reason, in existing LTE systems, random access procedures (also referred to as "RACH procedures (Random Access CHannel Procedures)," "access procedures," and so on) for establishing UL synchronization are supported.

In random access procedures, a user terminal acquires information related to UL transmission timing (timing advance (TA)) from a response (random access response), which a radio base station returns in response to transmission of a random access preamble (PRACH), and establishes UL synchronization based on this TA.

After UL synchronization is established, the user terminal receives downlink control information (DCI) (UL grant) from the radio base station, and then transmits UL data using the UL resource allocated by the UL grant.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In future radio communication systems (for example, 5G, NR, etc.), it is desirable to accommodate various services such as high-speed and large-capacity communication (eMBB: enhanced Mobile Broad Band), massive access (mMTC: massive MTC) from devices (user terminal) for inter-device communication (M2M: Machine-to-Machine) such as IoT (Internet of Things) and MTC (Machine Type Communication), and low-latency, reliable communication (URLLC: Ultra-Reliable and Low Latency Communication), in a single framework.

In such future radio communication systems, if random access procedures are performed in the same way as in existing LTE systems before UL data is transmitted, the latency time before UL data starts being transmitted will pose a problem. Also, in future radio communication systems, there is a possibility that the growth of overhead due to UL grants from radio base stations will pose a problem.

Therefore, envisaging future radio communication systems, there is an on-going study to perform communication by allowing contention of UL transmission by multiple user terminals, in order to shorten the latency time before UL data starts being transmitted, and to reduce the increase of overhead. For example, a study is in progress to allow a user terminal to transmit UL data without a UL grant from a radio base station (also referred to as "contention-based UL transmission," "UL grant-less (-free) UL transmission," "UL grantless and contention-based UL transmission," etc.).

Meanwhile, when a user terminal transmits UL data by applying contention-based UL transmission, case may occur where a radio base station cannot receive this UL data. In this case, how to control retransmission of this UL data is the problem. Alternatively, the user terminal may perform division transmission (packet segmentation) depending on the capacity of UL data. In this case, how to control division transmission is the problem.

The present invention has been made in view of the above, and it is therefore an object of the present invention to provide a user terminal and a radio communication method, whereby retransmission control and/or division transmission can be performed properly when contention-based UL transmission is employed.

Solution to Problem

According to one aspect of the present invention, a user terminal has a transmission section that transmits UL data, and a control section that controls retransmission and/or division transmission of the UL data, and, in this user terminal, the control section exerts control to perform new UL data transmission before the retransmission and/or initial transmission in the division transmission without UL grant from a radio base station, and the control section controls the retransmission and/or second and subsequent transmissions in the division transmission based on a response signal from the radio base station.

Advantageous Effects of Invention

According to the present invention, retransmission control and/or division transmission can be performed properly when contention-based UL transmission is employed.

BRIEF DESCRIPTION OF DRAWINGS

FIGS. 3A and 3B are diagrams to show examples of retransmission control for contention-based UL transmission according to the present embodiment;

DESCRIPTION OF EMBODIMENTS

Existing LTE systems (for example, LTE Rel. 8 to 13) support random access procedures for establishing UL synchronization. Random access procedures include contention-based random access (also referred to as "CBRA" and so on) and non-contention-based random access (also referred to as "non-CBRA," "contention-free random access (CFRA)," and so on).

In contention-based random access (CBRA), a user terminal transmits a preamble, which is selected randomly from a plurality of preambles provided for each cell (also referred to as "random access preambles," "random access channels (PRACHs)," "RACH preambles" and so on). Contention-based random access is user terminal-initiated random access procedures, and can be used, for example, when gaining initial access, starting or resuming UL transmission and so on.

On the other hand, in non-contention-based random access (non-CBRA, CFRA, etc.), a radio base station assigns preambles in a user terminal-specific manner, by using a downlink (DL) control channel (PDCCH (Physical Downlink Control Channel), EPDCCH (Enhanced PDCCH), etc.), and the user terminals transmit the preambles assigned by the radio base station. Non-contention-based random access is network-initiated random access procedures, and can be used, for example, when conducting handover, starting or resuming DL transmission and so on (when transmission of DL retransmission control information is started or restarted in the UL).

Figure 1:
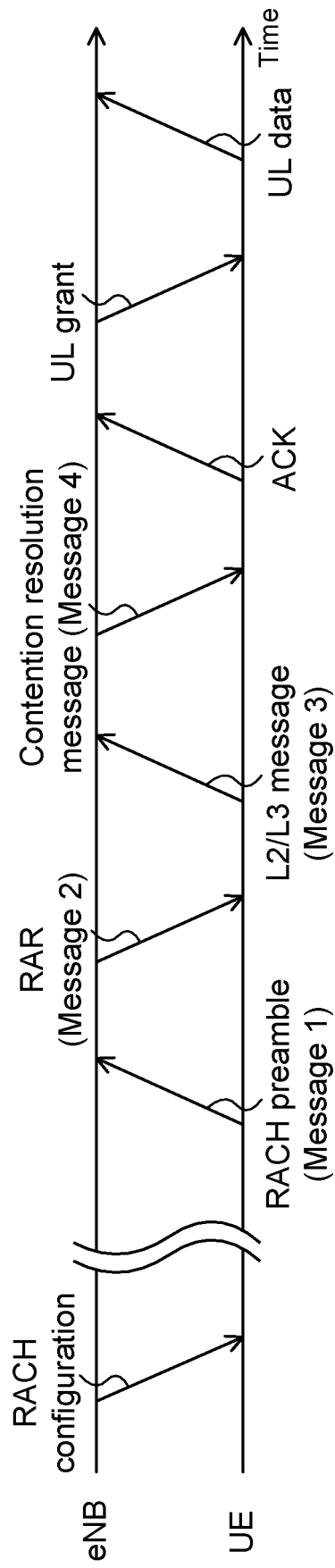
FIG. 1 is a diagram to show an example of random access procedures in existing systems.

FIG. 1 is a diagram to show an example of contention-based random access procedures. In FIG. 1, a user terminal receives, in advance, information (PRACH configuration information) that indicates the configuration of a random access channel (PRACH) (PRACH configuration, RACH configuration, etc.), via system information (for example, the MIB (Mater Information Block) and/or SIBs (System Information Blocks)), higher layer signaling (for example, RRC (Radio Resource Control) signaling) and so on.

The PRACH configuration information can indicate, for example, a plurality of preambles (for example, preamble formats) that are defined in each cell, the time resources that are used in PRACH transmission (including, for example, a system frame index, a subframe index and so on) and the offset (prach-FrequencyOffset) to indicate the starting position of frequency resources (for example, six resource blocks (PRBs (Physical Resource Blocks))).

As shown in FIG. 1, when the user terminal transitions from idle mode (RRC_IDLE) to RRC-connected mode (RRC_CONNECTED) (for example, when gaining initial access), if UL synchronization is not established despite the fact that the user terminal is in RRC-connected mode (for example, when UL transmission is started or resumed), the user terminal can randomly select one of a plurality of preambles that are indicated in the PRACH configuration information, and transmit the selected preamble using the PRACH (message 1).

Upon detecting the preamble, the radio base station transmits a random access response (RAR) (message 2) in response to that. After transmitting the preamble, the user terminal attempts to receive an RAR for a predetermined period (RAR window). If the user terminal fails to receive an RAR, the user terminal increases the transmission power of the PRACH and transmits (retransmits) the preamble again. Note that the act of increasing the transmission power upon retransmission is also referred to as "power ramping."

Upon receiving the RAR, the user terminal adjusts the transmission timing in the UL based on the timing advance (TA) that is included in the RAR, and establishes UL synchronization. Furthermore, the user terminal transmits a higher layer (L2/L3: layer 2/layer 3) control message (message 3) in the UL resource specified by the UL grant included in the RAR. This control message contains the user terminal's identifier (UE-ID). The user terminal's identifier may be, for example, a C-RNTI (Cell-Radio Network Temporary Identifier) in the event the user terminal is in RRC-connected mode, or may be a higher layer UE-ID such as an S-TMSI (System Architecture Evolution-Temporary Mobile Subscriber Identity) in the event the user terminal is in idle mode.

In response to the higher layer control message, the radio base station sends a contention-resolution message (message 4). The contention-resolution message is transmitted based on the above-mentioned user terminal identifier included in the control message. Upon successfully detecting the contention-resolution message, the user terminal transmits an HARQ (Hybrid Automatic Repeat reQuest)-based positive acknowledgment (ACK) to the radio base station. By this means, the user terminal in idle mode transitions to RRC-connected mode.

On the other hand, if the user terminal fails to detect the contention-resolution message, the user terminal judges that contention has occurred, reselects a preamble, and repeats the random access procedures from message 1 to message 4.

When learning from an ACK from the user terminal that the contention has been resolved, the radio base station transmits a UL grant to the user terminal. The user terminal starts transmitting UL data using the UL resource allocated by the UL grant.

According to the above-described contention-based random access, if the user terminal desires to transmit UL data, the user terminal can voluntarily (autonomously) start random access procedures. Also, since UL synchronization is established first and then UL data is transmitted using a UL resource that is allocated by a UL grant in a user terminal-specific manner, reliable UL transmission is made possible.

Now, future radio communication systems (for example, 5G, NR etc.) are anticipated to accommodate various services such as high-speed and large-capacity communication (eMBB), massive access (mMTC) from devices (user terminals) for inter-device communication (M2M) such as IoT and MTC, and low-latency, reliable communication (URLLC), in a single framework.

In such future radio communication systems, if the same contention-based random access as in existing LTE systems is executed before UL data is transmitted, there is a possibility that the latency time before UL data starts being transmitted will pose a problem. Also, in future radio communication systems, if, before UL data is transmitted, a request for UL resource allocation (scheduling request (SR)) from a user terminal is required, or this UL resource needs to be allocated from a radio base station (UL grant), the growth of overhead is likely to pose a problem.

For example, in the event of massive access such as mMTC, collisions of preambles may occur more frequently among user terminals, and the latency time before UL data starts being transmitted may increase. This is because, in above-described contention-based random access, when a collision of preambles occurs among a plurality of user terminals, at least one of these multiple user terminals must perform random access procedures again.

Also, in massive access such as mMTC, when a large amount of UL grants are transmitted from a radio base station to each user terminal, the ratio of overhead to UL data increases relatively. Consequently, in mMTC, the capacity of DL control channels may be tightened, the spectral efficiency may drop, and so on.

Figure 2:
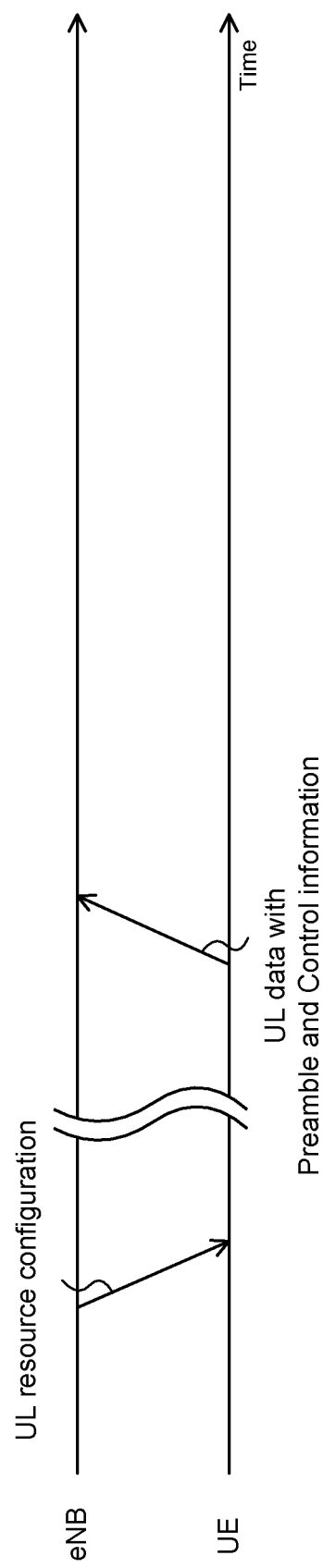
FIG. 2 is a diagram to show an example of contention-based UL transmission according to the present embodiment.

Therefore, in future radio communication systems, it is necessary to shorten the latency time it takes before UL data starts being transmitted, and to reduce the increase of overhead. In order to provide a resolution to this problem, contention-based UL transmission (also referred to as "contention-based UL data transmission"), in which contention of UL transmission by multiple user terminals is allowed, and in which UL data is transmitted without UL grants from radio base stations, is under research. FIG. 2 shows an example of contention-based UL transmission.

As shown in FIG. 2, a user terminal may receive configuration information related to contention-based UL (CBUL) transmission, in advance, via system information (for example, the MIB and/or SIBs), higher layer signaling (for example, RRC signaling) and so on.

Here, the configuration information related to contention-based UL transmission (CBUL) (hereinafter also referred to as "CBUL configuration information," "UL resource configuration information," etc.) may indicate at least one of a plurality of preambles from which the user terminal can make selections, and UL resources (time and/or frequency resources) for contention-based UL transmission. These UL resources may be indicated by using at least one of, for example, SFNs, subframe numbers, the number of frequency resources (the number of PRBs), frequency offsets, and UL resource subframe intervals.

As shown in FIG. 2, the user terminal starts transmitting UL data without receiving a UL grant from a radio base station. To be more specific, when the user terminal transmits UL data upon an event of new UL transmission, the user terminal may transmit a preamble, which is randomly selected, and control information pertaining to the UL data, together. Furthermore, the user terminal may transmit the above control information and UL data without a response from the radio base station to the preamble.

As shown in FIG. 2, in contention-based UL transmission, contention of UL data from a plurality of user terminals is permitted, so that it is possible to skip messages 2 to 4 (see FIG. 1) in the above-described contention-based random access. This will shorten the latency time before UL data starts being transmitted. Also, since UL data is transmitted without UL grants from the radio base station, overhead can be reduced.

Meanwhile, when the user terminal transmits UL data by applying contention-based UL transmission, cases may occur where this UL data cannot be received on the radio base station side. In particular, when multiple user terminals adopt contention-based UL transmission, due to the contention of UL data transmitted form varying terminals, the radio base station is more likely to fail detection. In this case, how to control retransmission of the UL data is the problem. Alternatively, the user terminal may perform division transmission (packet segmentation) depending on the capacity of UL data. In this case, how to control transmission of divided UL signals in contention-based UL transmission is the problem.

So, the present inventors have worked on a retransmission control method and/or a division transmission method that are suitable for contention-based UL transmission, and arrived at the present invention. To be more specific, the present inventors have focused on response signals which radio base stations transmit in response to transmission from user terminals, and come up with the idea of controlling retransmission and/or transmission (transmission timing, transmission method, etc.) after the initial transmission in division transmission based on response signals from radio base stations.

Also, the present inventors have a focused on the fact that, upon initial transmission, in which new UL data is transmitted, a radio base station needs to detect this UL transmission and identify which user terminal is making this UL transmission, and come up with the idea of transmitting, in addition to UL data, at least a preamble and/or control information pertaining to the UL data.

Now, embodiments of the present invention will be described below in detail with reference to the accompanying drawings. Note that the present embodiment is by no means limited to mMTC and URLLC, and can be applied to various services (for example, background communication, small packet communication, etc.).

Also, the present embodiment can be employed even when UL synchronization is established or when UL synchronization is not established. Also, the states a user terminal may be in according to the present embodiment include an idle state, an RRC-connected state and a state that is newly defined for contention-based UL transmission.

(Retransmission Control)

FIG. 3 is a diagram to show an example of retransmission control for contention-based UL transmission according to the present embodiment. A user terminal may receive configuration information related to contention-based UL (CBUL) transmission, in advance, via system information (for example, the MIB and/or SIBs), higher layer signaling (for example, RRC signaling) and so on.

When uplink data (new uplink data transmission) is produced, the user terminal transmits the UL data without a UL grant from the radio base station. When transmitting the new UL data, the user terminal can transmit a randomly-selected preamble, and/or control information pertaining to the UL data, in addition to the UL data.

The user terminal may include a buffer status report (BSR), which shows the size of buffered uplink data, in at least one of the preamble, the control information and the UL data, and report this to the radio base station. The radio base station can identify the user terminal that has transmitted the UL data based on the preamble and/or the control information pertaining to the UL data, transmitted from the user terminal, and perform channel estimation.

After the user terminal transmits new UL data by applying contention-based UL, the user terminal controls retransmission of this UL data depending on what response signal arrives from the radio base station. The retransmission control covers at least one of whether or not to make retransmission, the timing of retransmission, and the transmission method to employ upon retransmission. As for the response signals from the radio base station, signals associated with the user t terminal's identifier (for example, UE-ID) can be used. To be more specific, delivery acknowledgment signals (an ACK, a NACK and a DTX) and/or downlink control information (for example, a UL grant) can be used.

For example, when the user terminal receives an ACK from the radio base station, the user terminal judges that transmission has succeeded. Then, if there is more UL data to transmit, the user terminal makes new UL data transmission. On the other hand, when the user terminal receives a NACK from the radio base station, the user terminal judges that transmission has failed. Then, the user terminal retransmits the UL data that has been transmitted.

Alternatively, the user terminal may exert control so that, when a predetermined period passes without a response from the radio base station after the user terminal transmits new UL data by applying contention-based UL transmission, this UL data will be retransmitted. The predetermined period (predetermined time window) for judging whether or not there is a response from the radio base station may be defined in advance in the specification (for example, defined with a fixed value, or defined based on a predetermined algorithm, and so on), or may be reported from the radio base station to the user terminal in advance.

When performing retransmission (Retx), the user terminal may transmit a preamble and/or control information, in addition to the UL data, as when performing the initial transmission (Tx). FIG. 3A shows a case where, based on a response signal (for example, a NACK or a DTX) from a radio base station in response to new UL data transmission, a preamble and/or control information are transmitted, in addition to UL data, as when the initial transmission is made. Note that, upon retransmission, the user terminal may transmit UL data by omitting one or both of the preamble and the control information. This can reduce the overhead of UL transmission.

Alternatively, upon retransmission (Retx), the user terminal may transmit only UL data by omitting the preamble and the control information, and, when retransmission (Retx 2) is required a second time, transmit a preamble and/or control information, in addition to UL data, in the same way as when the initial transmission is made (see FIG. 3B). By transmitting a preamble and control information in addition to UL data, the accuracy of detection can be increased in the radio base station.

Furthermore, when the user terminal retransmits UL data that has been transmitted by applying contention-based UL transmission, the user terminal may apply the process for increasing the transmission power (power ramping). Power ramping may be applied to all of the UL data, the preamble and the control information, or may be applied only to part of these (for example, the preamble). By increasing the transmission power of the preamble, which the radio base station uses for signal detection, the rate of successful receipt of UL data can be improved.

Alternatively, the user terminal may retransmit UL data transmitted, by applying contention-based UL transmission, based on a UL grant (response signal) transmitted from the radio base station. In this case, the radio base station can include information about the UL data's transmission method (whether or not a preamble and/or uplink control information are transmitted) in a UL grant, and report the UL grant to the user terminal.

Also, when retransmission is required as a result of transmitting new UL data in contention-based UL transmission, the user terminal may retransmit the UL data by applying non-contention-based UL transmission.

(Division Transmission)

Figure 4:
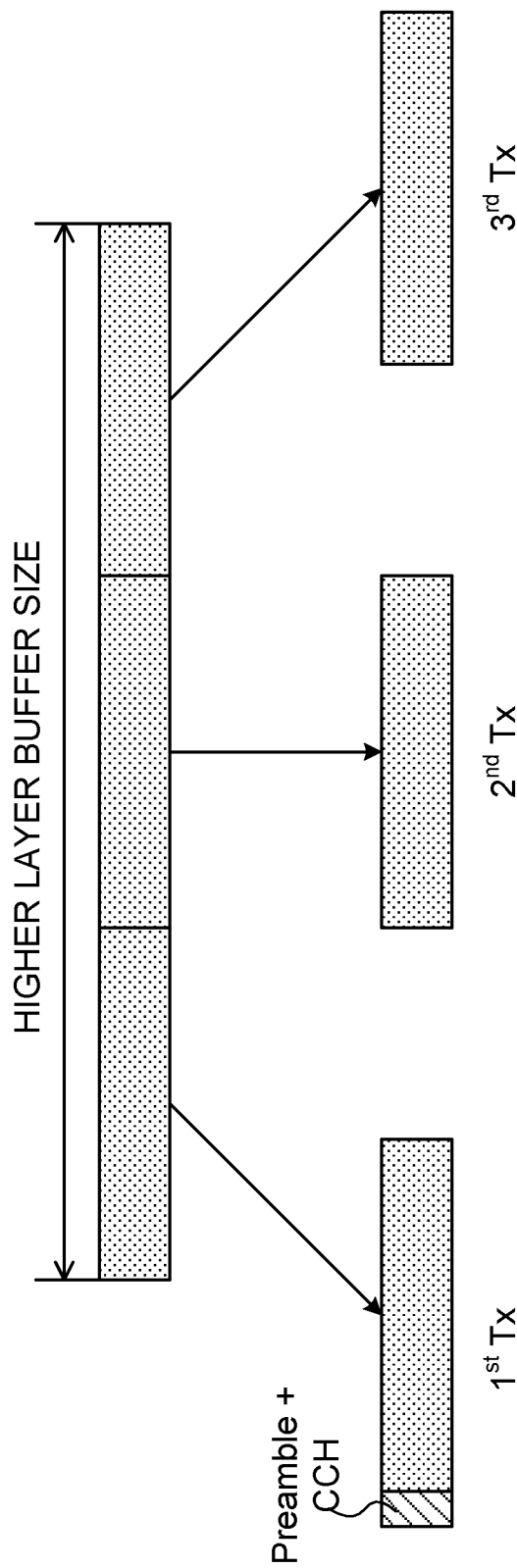
FIG. 4 is a diagram to show an example of dividing contention-based UL transmission according to the present embodiment.

FIG. 4 shows a schematic diagram, in which a user terminal transmits UL data in division transmission (packet segmentation). Here, a case is shown where a user terminal transmits UL data that is produced, in three divisions (the first Tx, the second Tx, and the third Tx). As for the unit of dividing UL data, for example, UL data may be divided in units that can be transmitted in subframes, or may be divided in other units. Note that, the number of divisions of UL data is no limited to three.

The user terminal can apply continuous transmission or discontinuous transmission to the divisions of UL data. Continuous transmission refers to the case where the divisions of UL data are transmitted all together. Note that the divisions of UL data do not necessarily have to be transmitted in a row in time. In continuous transmission, it is possible to receive a common (one) response signal (for example, an HARQ-ACK, or a UL grant) from the radio base station in response to the divisions of UL data that are transmitted.

By contrast with this, discontinuous transmission refers to the case where the divisions of UL data are transmitted separately. In discontinuous transmission, response signals which the radio base station transmits in response to the divisions of UL data that are transmitted can be configured differently. That is, when UL data is transmitted in three divisions, a response signal is transmitted from the radio base station in response to each of the three divisions of UL data transmitted.

When applying contention-based UL transmission to transmit multiple divisions UL data, at least in the initial transmission, the user terminal transmits, in addition to UL data, a preamble and/or control information pertaining to the UL data. On the other hand, in the second and subsequent transmissions, the user terminal can transmit UL data by omitting one or both of the preamble and the control information.

Furthermore, the user terminal may be configured to perform the first UL data transmission (for example, the first transmission in FIG. 4) without a UL grant, and control transmission based on UL grants in one of the second and subsequent UL data transmissions (for example, the second Tx in FIG. 4). Obviously, contention-based UL transmission can be applied to the second and subsequent UL data transmissions, as in the initial transmission.

When contention-based UL transmission is applied to UL data that is transmitted in multiple divisions, the user terminal can control each division of UL data to be transmitted in a predetermined transmission cycle. The predetermined transmission cycles are reported from the radio base station to the user terminal by higher layer signaling (for example, RRC signaling, broadcast information, etc.). Alternatively, the user terminal may decide on predetermined transmission cycles based on cell-specific and/or user-specific parameters.

Furthermore, the user terminal can include information (for example, a BSR) related to the size of the UL data (higher layer buffer size) in at least one of the preamble, the control information and the UL data, and transmit the information to the radio base station. In this case, the user terminal reports information about the size of the whole UL data and/or the size of each division of UL data, to the radio base station. Furthermore, information about the size of the UL data may be included only in the initial transmission (first Tx) in division transmission, and transmitted to the radio base station. By this means, it is possible to reduce the increase of overhead in UL transmission.

Also, even when UL data is transmitted in division transmission by applying contention-based UL transmission, as shown in FIG. 4, the above-described retransmission control can be applied.

Figure 5:
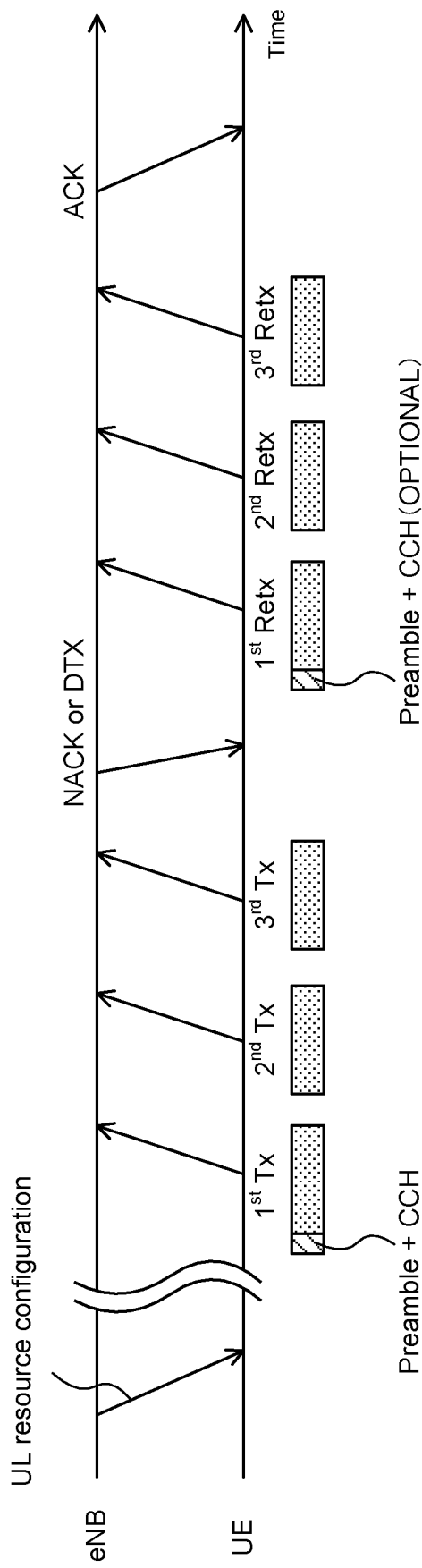
FIG. 5 is a diagram to show an example of retransmission control in the event contention-based UL transmission is divided, according to the present embodiment.

When the user terminal performs continuous transmission by applying contention-based UL transmission, the radio base station feeds back response signals to the user terminal after receiving all the UL data (for example, the first Tx to the third Tx in FIG. 4) transmitted from the user terminal. In this case, the user terminal can perform retransmission control for all the divided UL data (the first Tx to the third Tx) together FIG. 5 shows an example of retransmission control, where a common response signal is fed back from the radio base station to the user terminal in response to a plurality of divisions of UL data. The user terminal transmits a preamble and control information, in addition to UL data, at least upon the initial transmission (first Tx), among the divisions of UL data to be transmitted (the first Tx to the third Tx). FIG. 5 shows an example, in which the user terminal transmits a preamble and control information, in addition to UL data, upon the initial transmission (first Tx), and omits preambles and control information in subsequent transmissions (the second Tx and the third Tx). Obviously, preambles and control information may be transmitted in transmissions (the second Tx and the third Tx) after the initial transmission.

When, for example, the radio base station fails to receive one of the multiple divisions of UL data (the first Tx to the third Tx) that are transmitted from the user terminal in division transmission, the radio base station feeds back a NACK (or a DTX). When the response signal from the radio base station is a NACK (or a DTX), the user terminal can exert control so that all of the multiple divisions of UL data are retransmitted. In this case, the number of bits of response signals that are fed back from the radio base station can be reduced (down to one bit, for example).

Alternatively, the radio base station may produce information that shows the received result (for example, an ACK/NACK/DTX) of each of the multiple pieces of UL data, by using a plurality of bits, and feed back a response signal to the user terminal. For example, the radio base station feeds back a response signal containing an ACK/NACK/DTX for each of the multiple pieces of UL data (the first Tx to the third Tx) that have been transmitted from the user terminal in division transmission, to the user terminal. The user terminal can retransmit only the UL data that corresponding to a NACK, based on the response signal. As a result of this, retransmission of UL data transmission that has been successfully received at the radio base station can be omitted.

When the user terminal performs discontinuous transmission, the radio base station feeds back response signals to the user terminal in response to each UL data (for example, the first Tx, the second Tx and the third Tx in FIG. 4). The user terminal can control retransmission for each divided UL data.

Figure 6:
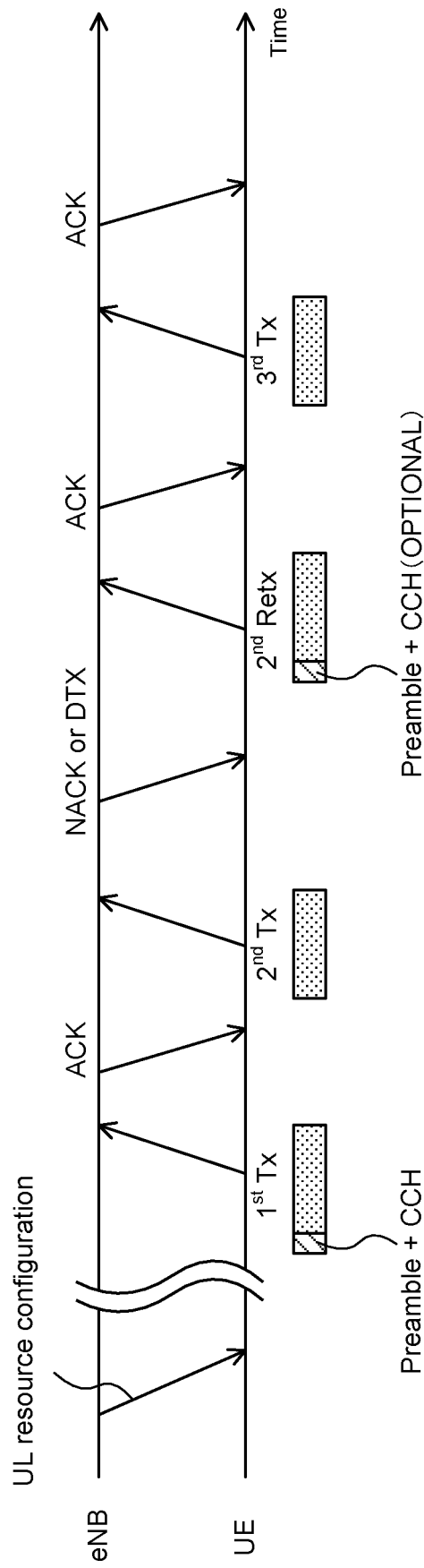
FIG. 6 is a diagram to show another example of retransmission control in the event contention-based UL transmission is divided, according to the present embodiment.

FIG. 6 shows an example of retransmission control, where response signals are fed back in response to each of a plurality of divided UL data, respectively. The user terminal transmits a preamble and/or control information, in addition to UL data, at least upon the initial transmission (first Tx), among the divisions of UL data to be transmitted (the first Tx to the third Tx).

FIG. 6 shows an example, in which the user terminal transmits a preamble and control information, in addition to UL data, upon the initial transmission (first Tx), and omits preambles and control information in subsequent transmissions (the second Tx and the third Tx). Also, FIG. 6 also shows a case where preambles and/or control information are transmitted in retransmissions of the second Tx and the third Tx. Obviously, preambles and control information may be transmitted in transmissions (the second Tx and the third Tx) after the initial transmission. Alternatively, preambles and control information may be omitted even in retransmission.

To be more specific, when an ACK is fed back from the radio base station in response to the initial transmission (first Tx), the user terminal transmits second UL data (second Tx). Furthermore, when a NACK (or a DTX) is fed back from the radio base station in response to the second Tx, the user terminal retransmits the second UL data. Upon the retransmission, the user terminal can transmit a preamble and/or control information, in addition to the UL data, so that the rate of detection in the radio base station can be improved. Also, when an ACK is fed back from the radio base station in response to the retransmission of the second Tx, the user terminal transmits third UL data (third Tx).

In this way, when the user terminal performs discontinuous transmission of divided UL data by applying contention-based UL transmission, the user terminal controls retransmission of the UL data based on response signals provided per division of UL data. In this case, as shown in FIG. 6, the user terminal can execute control so that each UL data (for example, the first Tx to the third Tx) is transmitted in order until received successfully at the radio base station. That is, when the user terminal transmits a given division of UL data, the user terminal performs control not to transmit the next UL data until ACK from the radio base station is received.

Alternatively, the user terminal may transmit each division of UL data in a predetermined cycle, in order, regardless of the response signals from the radio base station. When the timing of new UL data transmission and the timing of retransmission of UL data overlap, the user terminal can execute control to prioritize the retransmission. Also, if a predetermined period after the initial transmission, transmission of all UL data is not complete yet (ACKs have not been received in response to all UL data), it may be possible to switch to non-contention-based UL transmission as shown below.

Although ACK/NACK/DTX have been used as examples of response signals from the radio base station in the above-described retransmission control and division transmission, this is by no means limiting. For example, at least one of the signals included in message 4, which is transmitted as a contention-resolution message (which may be, for example, a contention resolution ID, a C-RNTI, etc.), may be transmitted as a response signal. In this case, if the user terminal receives a contention resolution ID that is transmitted in an uplink control channel (UL CCH), the user terminal sees this as an ACK. Furthermore, such response signals may be transmitted in at least one of a downlink control channel, a downlink shared data channel, a downlink retransmission channel, and so on.

(Use of Contention-Based UL Transmission and Non-Contention-Based UL Transmission)

The user terminal can select and employ contention-based UL transmission and non-contention-based UL transmission based on predetermined conditions. For example, in retransmission control and/or division transmission, the user terminal selects either contention-based UL transmission or non-contention-based UL transmission for each UL transmission.

The user terminal can select contention-based access (contention-based UL transmission) or non-contention-based access (non-contention-based UL transmission), based on at least one of the packet size, the bearer (QoS parameter (QCI), which is configured per bearer), and the service type. For example, the radio base station reports information about the criteria as to which transmission method is to be used, to the user terminal, via higher layer signaling (for example, RRC signaling, broadcast information, etc.). The criteria for selecting between contention-based access and non-contention-based access include the packet size, the RSRP threshold and so on.

For example, when the packet size is equal to or less than a predetermined value, the user terminal performs contention-based UL transmission. Alternatively, if in a service where it is desired to shorten the latency, the user terminal starts uplink communication using contention-based UL transmission.

Also, the user terminal may switch between contention-based access and non-contention-based access while communicating. For example, after contention-based access is gained and a UL signal is transmitted, if there is no response from the radio base station (or when a NACK or a DTX arrives from the radio base station as a response signal), the user terminal can switch to non-contention-based access and communicate.

Figure 7:
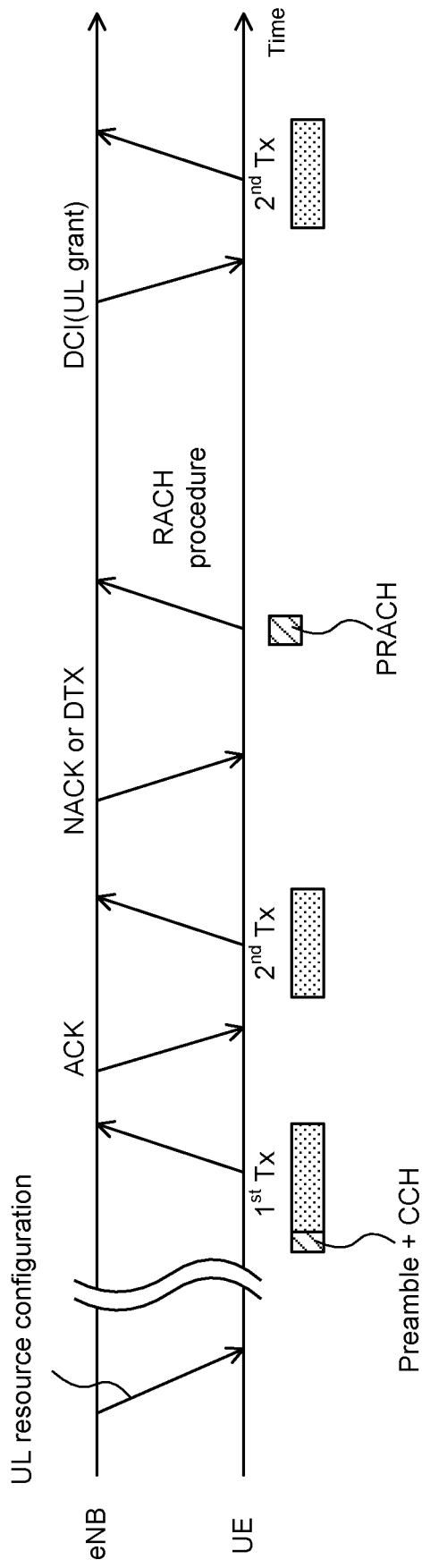
FIG. 7 is a diagram to show an example of retransmission control in the event contention-based UL transmission is divided, according to the present embodiment.

FIG. 7 shows an example, in which, when UL data is transmitted in division transmission (the first Tx to the third Tx) by applying contention-based UL transmission, contention-based UL transmission is switched to non-contention-based UL transmission midway. To be more specific, the user terminal performs the initial transmission (first Tx) in contention-based UL transmission. Also, when an ACK is fed back from the radio base station in response to the initial transmission, the user terminal applies contention-based UL transmission to the transmission (second Tx) of the second UL data too. On the other hand, given that a NACK (or a DTX) is fed back from the radio base station in response to the second Tx, the user terminal retransmits the second UL data.

Here, the user terminal applies non-contention-based UL transmission to the retransmission of the second UL data. In this case, based on the NACK (or the DTX) fed back from the radio base station, the user terminal transmits a PRACH and performs conventional random access procedures in order to perform non-contention-based UL transmission. Note that, in the event the user terminal receives no response signal from the radio base station for a predetermined period, the user terminal may perform random access procedures. Alternatively, the radio base station may transmit downlink control information to the user terminal, instead of (or in addition to) a NACK, to trigger random access procedures and switch to non-contention-based UL transmission.

After random access procedures are complete, the user terminal performs non-contention-based UL transmission (the second Tx, the third Tx and so on) based on UL grants transmitted from the radio base station (that is, by using C-RNTIs). By this means, it is possible to prevent increased retransmissions in contention-based UL transmission. As described above, by controlling switching of contention-based UL transmission and non-contention-based UL transmission based on predetermined conditions, it is possible to perform UL transmission properly.

(Transmission Format)

Next, the transmission format for contention-based UL transmission that can be used with the present embodiment will be described. The transmission format according to the present embodiment may be comprised of an access channel (random access channel) that transmits preambles, which are selected randomly, a control channel (UL control channel) that transmits UL data control information, and a data channel (UL data channel) that transmits UL data.

In the following description, the access channel, the control channel and the data channel constituting the transmission format of the present embodiment will be referred to as the "random access channel (RACH)," the "UL control channel (ULCCH)" and the "UL data channel (UL data CH)," respectively, for ease of explanation, but these channels constituting the transmission format are not limited to these names. Also, the transmission format may be referred to as "transmission frame configuration," "frame configuration" and so on.

Figure 8:
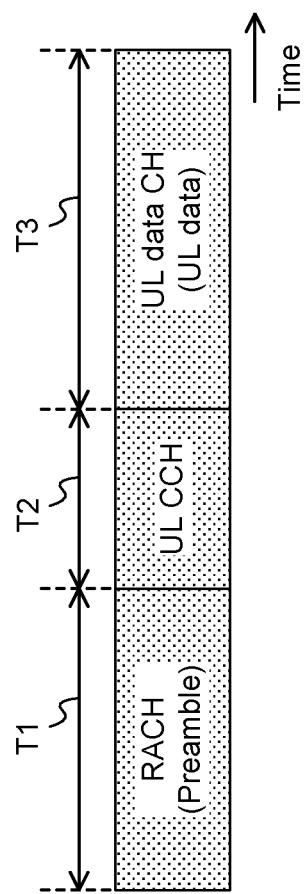
FIG. 8 is a diagram to show an example of the transmission format according to the present embodiment.

FIG. 8 is a diagram to show an example of the transmission format according to the present embodiment. As shown in FIG. 8, the random access channel, the UL control channel and the UL data channel may be arranged in varying time resources (that is, may be time-division-multiplexed).

For example, in FIG. 8, the transmission period of the random access channel is comprised of time duration T1, the transmission period of the UL control channel is comprised of time duration T2, and the transmission period of the UL data channel is comprised of time duration T3. Here, time durations T1, T2 and T3 are each comprised of, for example, one or more symbols, one or more subframe intervals, one or more subframes, one or more TTI, or one or more scheduling units, but the present invention is by no means limited to these, as long as a predetermined number of time units are used. Also, among the random access channel, the UL control channel and the UL data channel, the radio parameters (for example, at least one of the subcarrier spacing, the transmission bandwidth, the CP duration, the symbol duration, the subframe duration, the subframe spacing, etc.) may vary.

Note that, in FIG. 8, transmission periods T1, T2 and T3 of the random access channel, the UL control channel, and the UL data channel are continuous in time, but at least one of these transmission periods may be discontinuous. Also, a non-transmission period such as a guard period may be provided in each transmission period. Also, in FIG. 8, time duration T2 is shorter than time durations T1 and T3, but this is not limiting. Time duration T2 may be adjusted in accordance with the amount of control information, time duration T3 may be adjusted appropriately in accordance with the amount of UL data.

Referring to FIG. 8, in the random access channel, a preamble (sequence) that is used to detect UL transmission in the radio base station is transmitted. By transmitting the random access channel (preamble) before the UL data channel, when there is an event of new UL data transmission, the radio base station can detect this UL transmission.

This preamble (sequence) may be selected on a random basis from a plurality of preambles that are reported in system information or by higher layer signaling (for example, a plurality of preambles indicated in the above CBUL configuration information). The multiple preambles may be provided on a per cell basis.

Also, the preamble (sequence) can be used for beam search and/or UL channel estimation when beamforming is applied to UL data. As preambles (sequences), a common preamble may be used for one or more uses (for example, detection of UL transmission, beam search, channel estimation, etc.), or use-specific preambles may be used.

Among preambles that are use-specific, at least one of the sequence pattern, the UL resource for transmission (for example, at least one of the time resource, the frequency resource, the code resource and so on), the number of repetitions, and the frequency hopping pattern may vary. For example, a first preamble for use for detecting UL transmission may be transmitted in a first period within a random access channel transmission period, and, in a second period following the first period, a second preamble for another use (for example, beam search or channel estimation) may be transmitted.

Furthermore, UL resources for the random access channel may be indicated by the above CBUL configuration information, or may be determined in advance. For example, a predetermined number of PRBs (for example, six PRBs) may be designated as frequency resources, or may be determined in advance. Also, as for time resources, a subframe of a predetermined index number or a system frame number (SFN) may be designated, or may be determined in advance.

Also, in FIG. 8, in the UL control channel (CCH), control information for UL data is transmitted. This control information may include at least one of, for example, identification information of the user terminal that transmits the UL data, information related to the UL data, information about the capability of the user terminal, information about the UL data's transmission resources, information about the UL data's retransmission control, and information about the repetitions of the UL data.

The above identification information of the user terminal may be, for example, a C-RNTI if the user terminal is in the RRC-connected state, higher layer user terminal identification information such as an S-TMSI if the user terminal is in the idle state. Furthermore, the above information related to the UL data may refer to at least one of the amount of the UL data (BSR: Buffer Status Report), the modulation scheme, the transport block size (TBS), and the coding rate.

Furthermore, the information about the capability of the user terminal may specify whether single-tone transmission is performed or multi-tone transmission is performed, and so on. The information about the UL data's transmission resources may indicate at least one of the frequency resource (for example, a subcarrier index, a PRB index, the number of PRBs, etc.), the time resource (for example, a subframe index, an SFN, etc.), the code resource (for example, an orthogonal spreading code such as a cyclic shift (CS), a scrambling pattern (OCC: Orthogonal Cover Code) and so on, a spreading factor, etc.), the power resource (for example, when UL data of a plurality of user terminals is power-multiplexed) and the space resource (for example, when UL data of a plurality of user terminals is space-multiplexed).

Furthermore, the information about the UL data's retransmission control may include the HARQ process number (HPN) of the UL data, the redundancy version (RV) of the UL data, and a new data indicator (NDI), which indicates whether or not the UL data is retransmitted data. Furthermore, the information about the repetitions of the UL data may indicate at least one of the number of times the UL data is repeated, the hopping pattern, and whether or not hopping is applied. Furthermore, other pieces of control information may be reported in the UL control channel, including information about SPS (Semi-Persistent Scheduling) transmission, information as to whether or not UCI is present in the UL data channel and so on.

Furthermore, in the UL control channel, in addition to the above control information, at least one of cyclic redundancy check (CRC) bits and padding bits for error detection may be transmitted. Also, UL reference signals (for example, reference signals for channel estimation and sounding) may be multiplexed in the UL control channel, or no UL reference signals may be multiplexed. Whether or not these UL reference signal are provided may be determined in advance, or may be configured by system information or higher layer signaling (for example, the above CBUL configuration information).

Also, in FIG. 8, UL data is transmitted in the UL data channel (data CH). Also, UL reference signals (for example, reference signals for channel estimation and sounding) may be multiplexed in the UL data channel, or no UL reference signals may be multiplexed. Whether or not these UL reference signal are provided may be determined in advance, may be reported in the UL control channel, or may be configured by system information or higher layer signaling (for example, the above CBUL configuration information).

Also, in the transmission format according to the present embodiment, repetitious transmission may be applied to at least one of the random access channel, the UL control channel and the UL data channel. Parameters related to this repetitious transmission (for example, the number of repetitions, whether or not repetitious transmission is performed, etc.) may be determined based on the received power (RSRP: Reference Signal Received Power) and/or the number of retransmissions, or may be configured by system information or higher layer signaling (for example, the above CBUL configuration information).

The above transmission format is comprised of a random access channel, a UL control channel and a UL data channel, but the transmission format of the present embodiment is by no means limited to this, and may be comprised of any channel as long as randomly-selected preambles, UL data control information, UL data and so on can be transmitted. For example, control information for UL data may be transmitted via the UL data channel like "UCI on PUSCH."

Also, in the transmission format described above, a preamble, control information and UL data are all multiplexed over different time resources, but the transmission format of the present embodiment is by no means limited to this. For example, at least one of a preamble, control information and UL data may be transmitted in the same time resource. In this case, the preamble, the control information and the UL data may be divided based on frequency resources, or may be divided based on code resources.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 9:
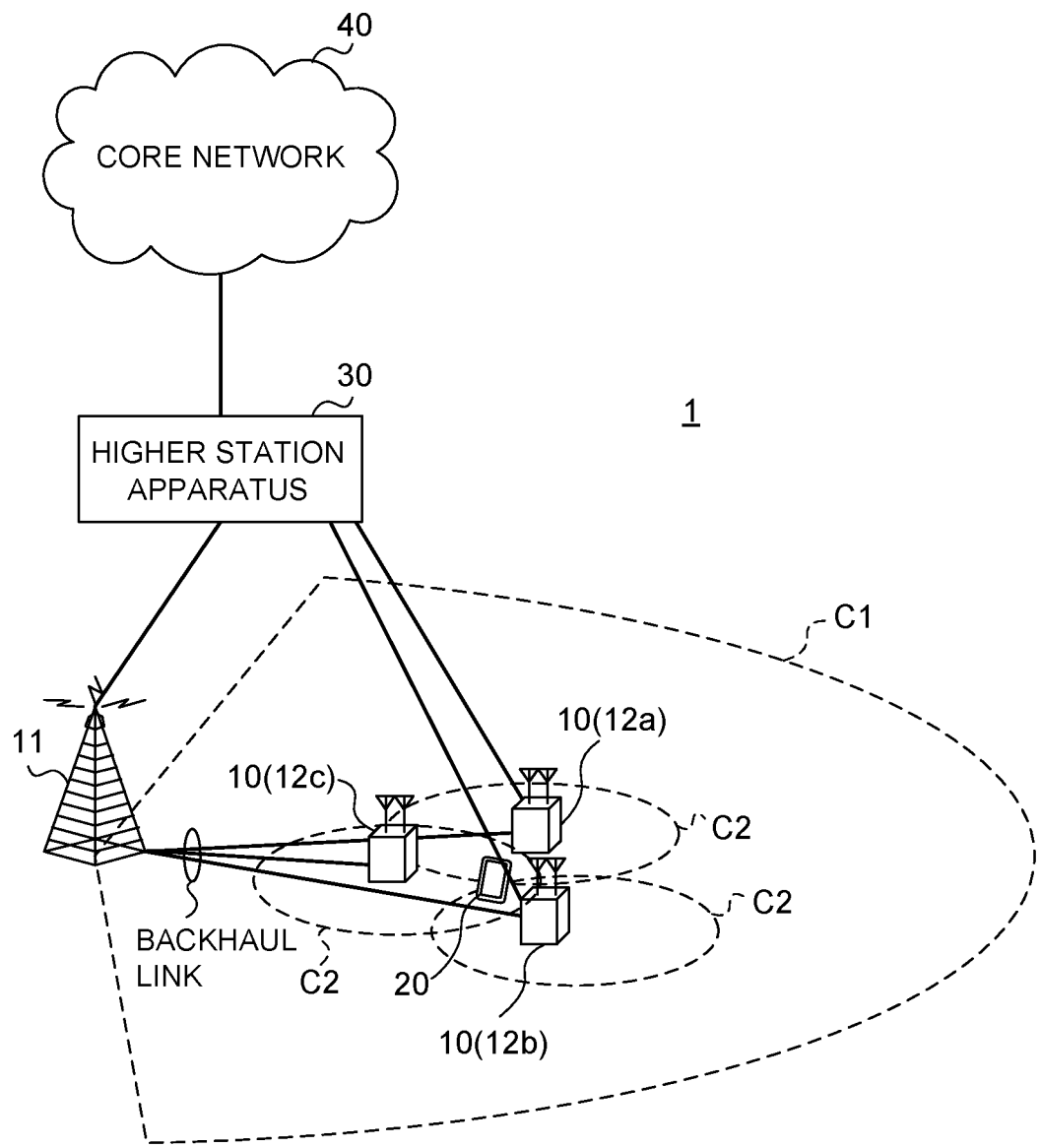
FIG. 9 is a diagram to show a schematic structure of a radio communication system according to the present embodiment.

FIG. 9 is a diagram to show a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 9 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are applied to some of a plurality of cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, UL data channel (PUSCH: Physical Uplink Shared CHannel, which is also referred to as "UL shared channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI: Uplink Control Information), including at least one of delivery acknowledgment information (ACK/NACK) and radio quality information (CQI), is transmitted by the PUSCH or the PUCCH. By means of the PRACH, random access preambles for establishing connections with cells are communicated.

(Radio Base Station)

Figure 10:
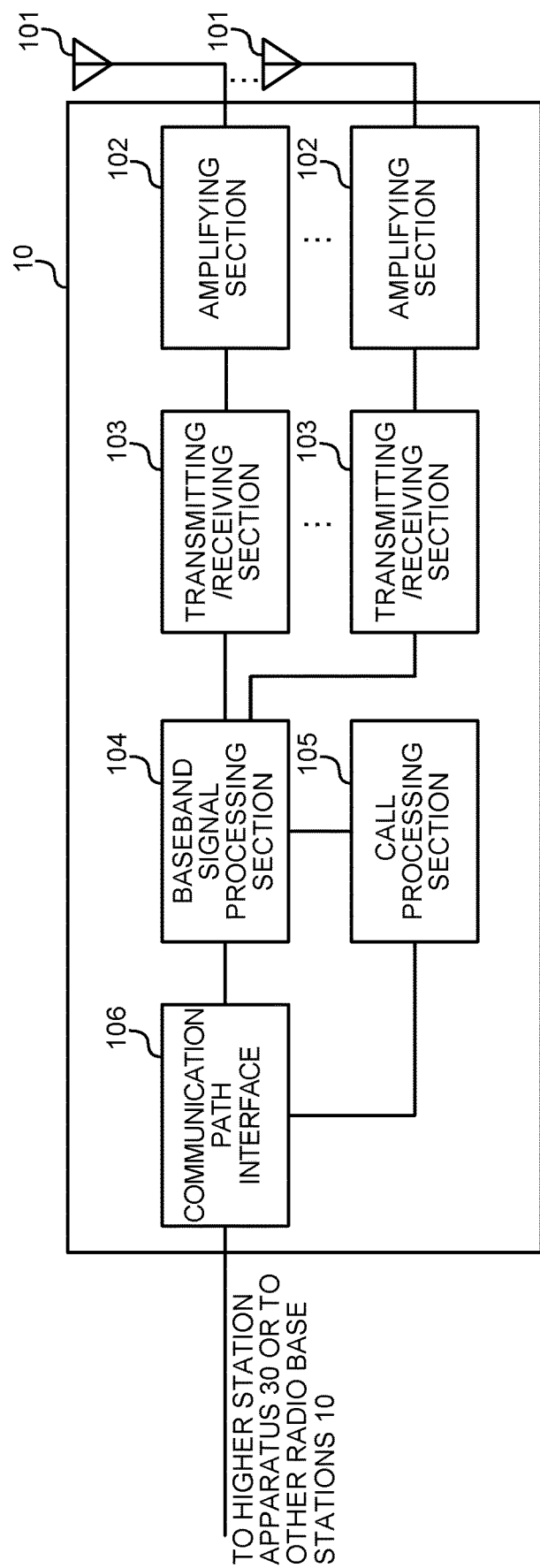
FIG. 10 is a diagram to show an example of an overall structure of a radio base station according to the present embodiment.

FIG. 10 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals (DL control channels), DL data signals (DL data channels, DL shared channels and so on), DL reference signals (DM-RS, CSI-RS and so on), discovery signals, synchronization signals, broadcast signals and so on), and receive UL signals (for example, UL control signals (UL control channels), UL data signals (UL data channels, UL shared channels and so on), UL reference signals and so on).

To be more specific, using system information or by higher layer signaling, the transmitting/receiving sections 103 transmit information related to contention-based UL transmission (for example information about the transmission cycle, conditions for switching between contention-based UL transmission and non-contention-based UL transmission, CBUL configuration information, etc.). In addition, the transmitting/receiving sections 103 receive UL signals (at least one of preambles, control information, and UL data) transmitted from the user terminals 20 in contention-based UL transmission. Furthermore, the transmitting/receiving sections 103 transmit response signals to the UL data transmitted from the user terminal 20.

The transmitting section and the receiving section of the present invention are comprised of a transmitting/receiving section 103 and/or a communication path interface 106.

Figure 11:
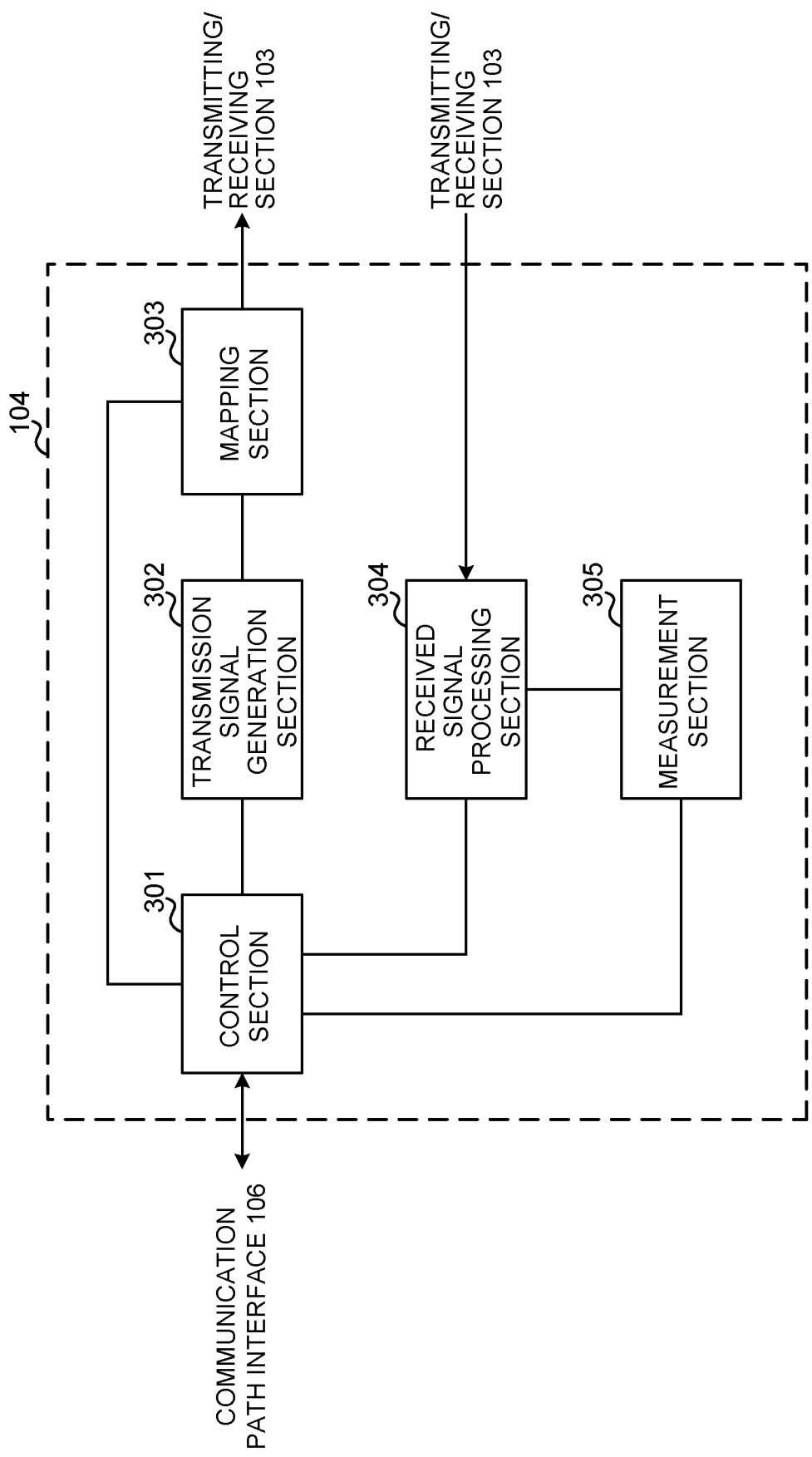
FIG. 11 is a diagram to show an example of a functional structure of a radio base station according to the present embodiment.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

Furthermore, the control section 301 may control contention-based UL (CBUL) transmission, in which UL data is transmitted from the user terminals 20 without UL grants. For example, the control section 301 may determine the above-noted CBUL configuration information, including, for example, UL resources that can be used in contention-based UL transmission, and so on.

Furthermore, the control section 301 can make decisions pertaining to retransmission control (ACK/NACK/DTX), based on results of decoding in the received signal processing section 304. Also, the control section 301 may control the switching of contention-based UL transmission and non-contention-based UL contention in the user terminal (see FIG. 7).

Furthermore, the control section 301 may control receipt of UL data according to the transmission format for contention-based UL transmission. Here, this transmission format may be comprised of a random access channel for transmitting randomly-selected preambles, a control channel for transmitting control information that is used to receive the UL data, and a data channel for transmitting the UL data (FIG. 8).

For example, the control section 301 may detect UL transmissions based on the above preambles. Furthermore, the control section 301 may blind-decode UL control channels and identify the user terminals 20 based on the detected control information. Furthermore, the control section 301 may control the receiving process (demodulation, decoding, etc.) of UL data from the user terminals 20 in accordance with the above control information. Also, the control section 301 may control beam search and/or channel estimation, which are performed based on the above preambles.

The transmission signal generation section 302 generates DL signals (DL control channels, DL data channels, DL reference signals such as DM-RSs, and so on) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channels, UL data channels, UL reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

(User Terminal)

Figure 12:
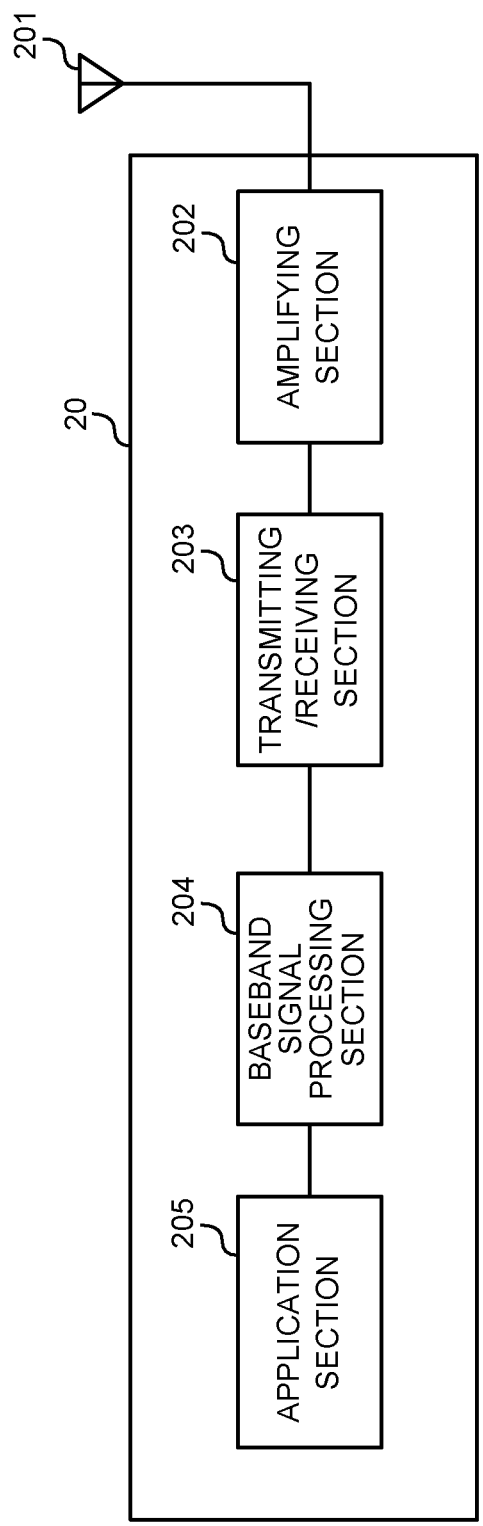
FIG. 12 is a diagram to show an example of an overall structure of a user terminal according to the present embodiment.

FIG. 12 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, in the DL data, the system information and the higher layer control information are also forwarded to the application section 205.

Meanwhile, the UL data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals (DL control channels), DL data signals (DL data channels, DL shared channels and so on), DL reference signals (DM-RS, CSI-RS and so on), discovery signals, synchronization signals, broadcast signals and so on), and transmit UL signals (for example, UL control signals (UL control channels), UL data signals (UL data channels, UL shared channels and so on), UL reference signals and so on).

To be more specific, the transmitting/receiving sections 203 receive, in system information or by higher layer signaling, information related to contention-based UL transmission (for example information about the transmission cycle, conditions for switching between contention-based UL transmission and non-contention-based UL transmission, CBUL configuration information, etc.). In addition, the transmitting/receiving sections 203 transmit UL signal (at least one of preambles, control information and UL data) based on the transmission format for contention-based UL transmission. In addition, the transmitting/receiving sections 203 receive response signals (for example, HARQ-ACK) to the UL data transmitted from the user terminal 20, and perform retransmission (see FIG. 3). Furthermore, the transmitting/receiving sections 203 perform division transmission depending on the size of UL data and so on (see FIG. 4).

Figure 13:
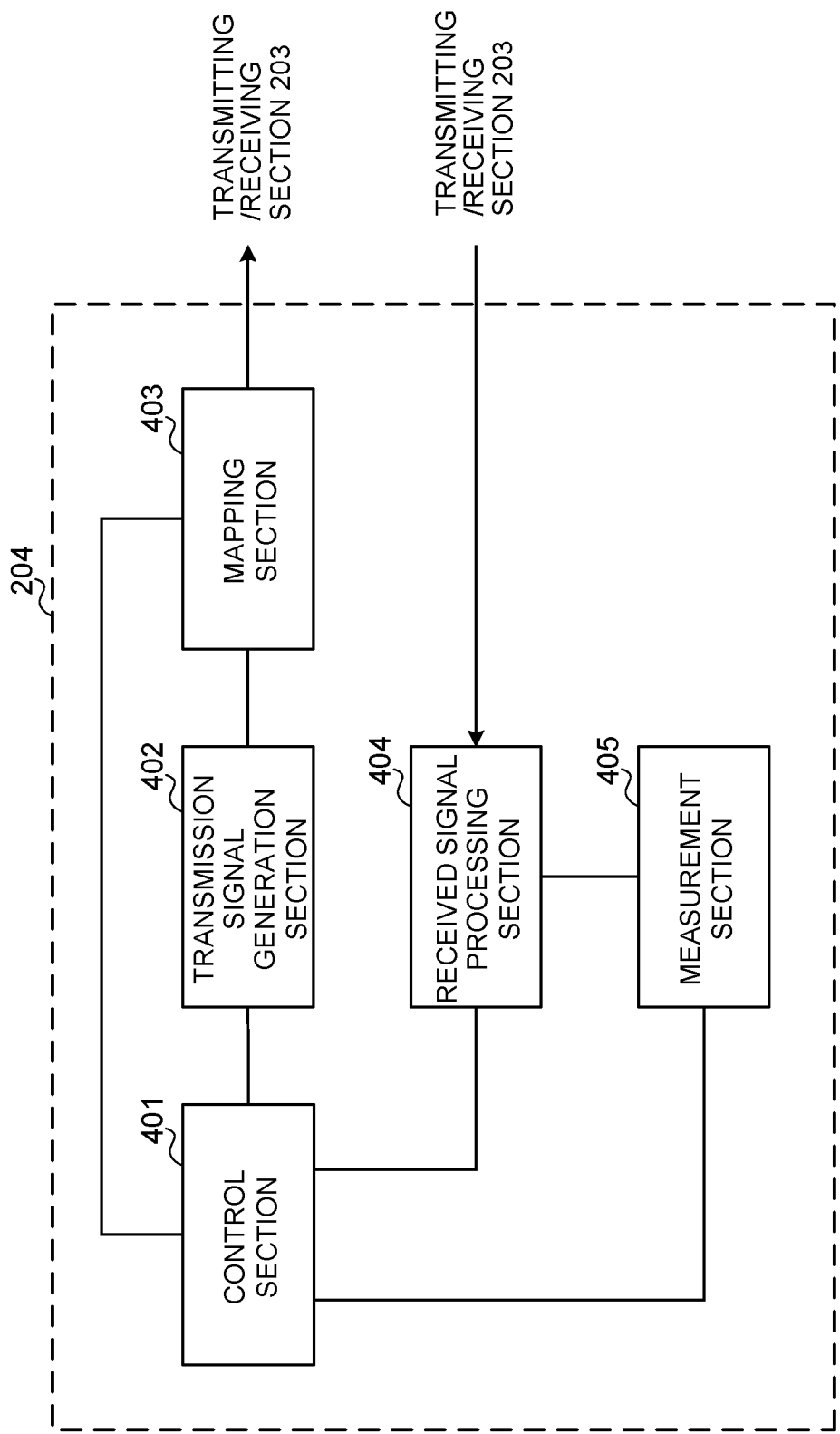
FIG. 13 is a diagram to show an example of a functional structure of a user terminal according to the present embodiment.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires a DL control channel and a DL data channel transmitted from the radio base station 10 from the received signal processing section 404. To be more specific, the control section 401 controls the transmitting/receiving sections 203 and the received signal processing section 404 to blind-decode the DL control channel to detect DCI, and receive the DL data channel based on the DCI. In addition, the control section 401 estimates channel gain based on DL reference signals and demodulates the DL data channel based on the estimated channel gain.

The control section 401 may control transmission of retransmission control information (for example, HARQ-ACK, etc.) transmitted in a UL control channel or a UL data channel, based on results of deciding whether or not retransmission control is necessary for DL data channels, and so on. Furthermore, the control section 401 may control transmission of channel state information (CSI), which is generated based on DL reference signals.

In addition, the control section 401 controls contention-based UL transmission (CBUL). In addition, the control section 401 controls retransmission and/or division transmission of contention-based UL data transmission. For example, the control section 401 exerts control so that new UL data transmission before retransmission and/or the initial transmission in division transmission are performed without UL grants from the radio base station, and retransmission of the new UL data and/or the second and subsequent transmissions in division transmission are performed based on response signals from the radio base station (see FIG. 3).

Also, the control section 401 exerts control so that, in new UL data transmission before retransmission and/or the initial transmission in division transmission, a preamble signal and/or control information pertaining to UL data are transmitted, in addition to the UL data to be transmitted, and, in retransmission and/or in one of the second and subsequent transmissions in division transmission, a preamble signal and/or control information are not transmitted (see FIG. 5 and FIG. 6). Furthermore, the control section 401 may control retransmission and/or one of the second and subsequent transmissions in division transmission based on UL grants transmitted from the radio base station.

Furthermore, the control section 401 can exert control so that after new UL data transmission before retransmission and/or the initial transmission in division transmission are performed without UL grants from the radio base station, retransmission and/or one of the second and subsequent transmissions in division transmission are performed based on UL grants that are transmitted after random access procedures (see FIG. 7). To be more specific, the control section 401 may control UL data transmission, without UL grants, in accordance with the transmission format for contention-based UL transmission (see FIG. 8).

The transmission signal generation section 402 generates UL signals (UL control channels, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates UL data channels based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channels, DL data channels, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or reception of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
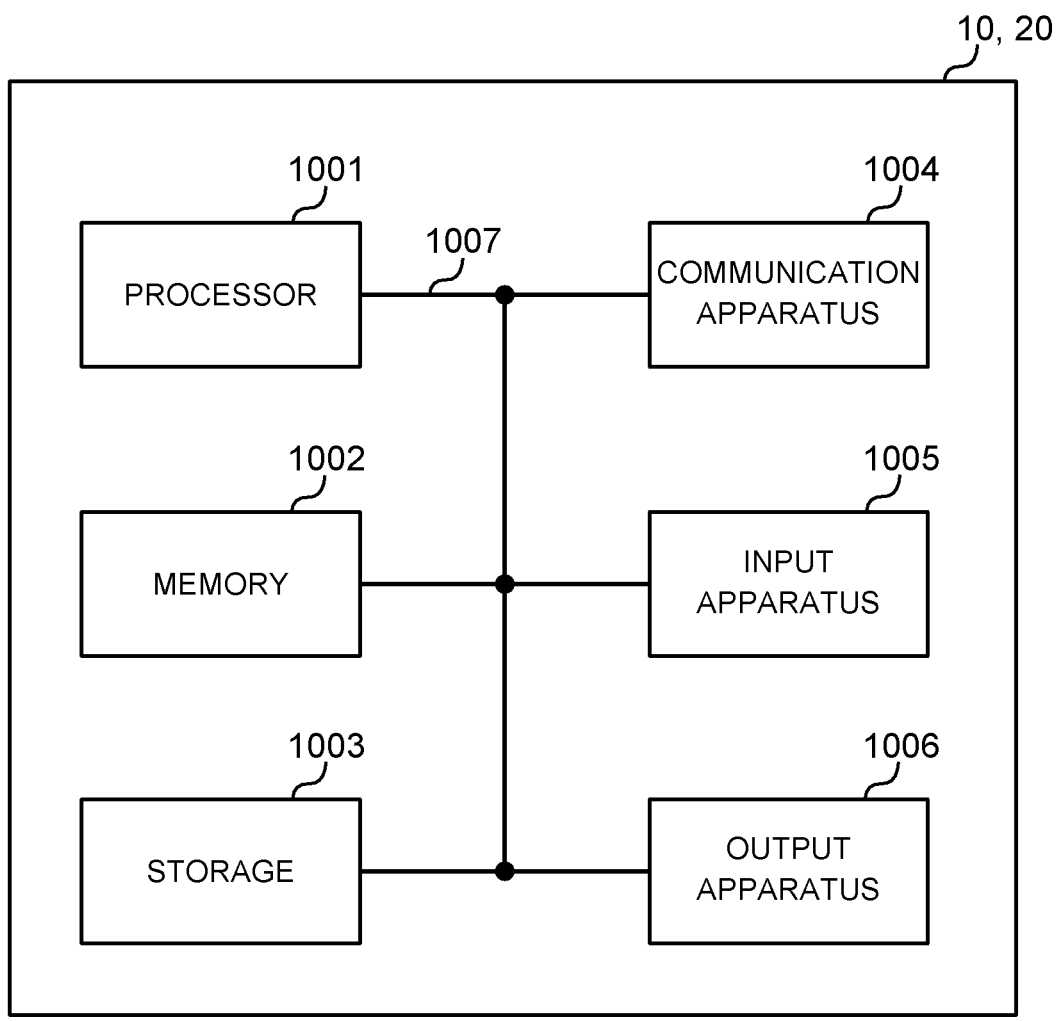
FIG. 14 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 14 is a diagram to show an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be comprised of a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be comprised of a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information). Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-093479, filed on May 6, 2016, including the specification, drawings and abstract, is incorporated herein by reference in its entirety.

The invention claimed is:

1. A terminal comprising:
   a transmitter that transmits a physical random access channel (PRACH) and UL data; and
   a processor that controls retransmission of the UL data,
   wherein the processor exerts control to perform new UL data transmission, before the retransmission, without a UL grant from a radio base station, and
   the processor controls the retransmission based on a UL grant that is transmitted from the radio base station, and
   the processor determines whether or not to transmit the PRACH and the UL data by time-division multiplexing based on a reference signal received power (RSRP) threshold reported by higher layer signaling.

2. A radio communication method for a terminal that communicates with a radio base station, the radio communication method comprising:
   transmitting a physical random access channel (PRACH) and UL data, and
   controlling retransmission of the UL data,
   wherein the terminal performs new UL data transmission, before the retransmission, without a UL grant from a radio base station, and
   the terminal controls the retransmission based on a UL grant from the radio base station, and
   the terminal determines whether or not to transmit the PRACH and the UL data by time-division multiplexing based on a reference signal received power (RSRP) threshold reported by higher layer signaling.

3. A base station comprising:
   a receiver that receives a physical random access channel (PRACH) and UL data; and
   a processor that controls a reception of a retransmission of the UL data,
   wherein the processor exerts control to receive new UL data, before the retransmission, transmitted without a UL grant, and
   the processor controls a reception of the retransmission transmitted based on the UL grant from the base station, and
   the processor reports a reference signal received power (RSRP) threshold, by higher layer signaling, related to a determination of whether or not the PRACH and the UL data are transmitted by time-division multiplexing.

4. A system comprising a terminal and a base station, wherein:
   the terminal comprises:
      a transmitter that transmits a physical random access channel (PRACH) and UL data; and
      a first processor that controls retransmission of the UL data,
      wherein the first processor exerts control to perform new UL data transmission, before the retransmission, without a UL grant from a radio base station, and
      the first processor controls the retransmission based on a UL grant that is transmitted from the radio base station, and
      the first processor determines whether or not to transmit the PRACH and the UL data by time-division multiplexing based on a reference signal received power (RSRP) threshold reported by higher layer signaling, and
   the base station comprises:
      a receiver that receives the PRACH and the UL data; and
      a second processor that controls the reception of the retransmission of the UL data,
      wherein the second processor exerts control to receive the new UL data, before the retransmission, transmitted without the UL grant, and
      the second processor controls the reception of the retransmission transmitted based on the UL grant from the base station, and
      the second processor reports the RSRP threshold, by higher layer signaling, related to the determination of whether or not the PRACH and the UL data are transmitted by time-division multiplexing.

* * * * *